United States Patent [19]
Nordberg

[11] Patent Number: 5,988,775
[45] Date of Patent: Nov. 23, 1999

[54] RESILIENT TRACK TENSIONING DEVICE FOR TRACK-DRIVEN VEHICLES AND TRACK UNIT COMPRISING SUCH A TRACK TENSIONING DEVICE

[75] Inventor: Björn Nordberg, Örnsköldsvik, Sweden

[73] Assignee: Hagglunds Vehicle AB, Ornskoldsvik, Sweden

[21] Appl. No.: 08/981,413

[22] PCT Filed: May 31, 1996

[86] PCT No.: PCT/SE96/00720

§ 371 Date: Dec. 16, 1997

§ 102(e) Date: Dec. 16, 1997

[87] PCT Pub. No.: WO97/00191

PCT Pub. Date: Jan. 3, 1997

[30] Foreign Application Priority Data

Jun. 16, 1995 [SE] Sweden .................................. 9502206

[51] Int. Cl.⁶ .................................................. B62D 55/00
[52] U.S. Cl. .......................... 305/143; 305/150; 305/151; 305/153; 305/154; 305/130; 305/133; 305/131
[58] Field of Search .................................. 305/143, 150, 305/151, 130, 133, 153, 154, 131

[56] References Cited

U.S. PATENT DOCUMENTS

| | | | |
|---|---|---|---|
| 1,393,157 | 10/1921 | Ollivier | 305/133 |
| 1,401,625 | 12/1921 | Mader | 305/131 |
| 1,781,486 | 11/1930 | White | 305/131 |
| 2,284,821 | 6/1942 | Heaslet | 305/154 |
| 2,315,421 | 3/1943 | Heaslet . | |
| 2,779,636 | 1/1957 | Allen | 305/133 |
| 2,846,276 | 8/1958 | Hendrickson . | |
| 2,859,045 | 11/1958 | Beaufort et al. | 280/124.102 |
| 3,692,130 | 9/1972 | Stacy, Jr. | 305/132 |
| 3,953,085 | 4/1976 | Randour | 305/130 |
| 4,458,773 | 7/1984 | Desourdy | 305/130 |
| 4,650,260 | 3/1987 | Satzler | 305/152 |

FOREIGN PATENT DOCUMENTS

| | | |
|---|---|---|
| 0 597 350 | 5/1994 | European Pat. Off. . |
| 25 21 145 | 11/1976 | Germany . |

*Primary Examiner*—D. Glenn Dayoan
*Assistant Examiner*—Long Bao Nguyen
*Attorney, Agent, or Firm*—Young & Thompson

[57] ABSTRACT

A resilient track-tensioning device for tracked automotive vehicles has a track tensioning wheel arrangement (26) which includes a generally elongated pendular arm (38) which rotatably supports a track-tensioning wheel unit (62), a pretensioning or biassing arm (72) which is much shorter than the pendular arm and which has a first end-part for force transmission engagement with the pendular arm (38) at its end-part (74) that carries the track-tensioning wheel unit (62), and a second end-part for pivotal attachment to a carrier (20) through the medium of a pretensioning or biassing means (76). The device further includes an element (66) for adjustably fixing the distance between the rotational center of the track-tensioning wheel unit (62) and the attachment point (46) of the pendular arm (38). The invention also relates to a track support assembly which includes an inventive track-tensioning device.

25 Claims, 5 Drawing Sheets

RESILIENT TRACK TENSIONING DEVICE FOR TRACK-DRIVEN VEHICLES AND TRACK UNIT COMPRISING SUCH A TRACK TENSIONING DEVICE

FIELD OF THE INVENTION

The present invention relates to a resilient track-tensioning device for tracked automotive vehicles, said device including a track tensioning wheel arrangement for attachment to the rear of a carrier which carries track-wheel units that form part of the vehicle track support assembly.

BACKGROUND OF THE INVENTION

In the case of a known articulated tracked vehicle unit comprising a front and a rear carriage which are pivotally connected together and each of which has two track support assemblies of essentially similar construction for driving an endless drive track or tread which runs around the track-support assembly includes a carrier, a so-called saddle beam, on which there is journalled a drive wheel unit, a plurality of carrier wheel units and a track tensioning wheel unit. The tensioning wheel unit on the track support assembly is positioned furthest to the rear of the saddle beam and is also required to function as a tensioning wheel, i.e. is required to be positionable in the longitudinal direction of the track support assembly so as to enable track tension to be adjusted, and also to function as a track carrier wheel so as to therewith minimize the pressure exerted by the track support assembly on the underlying ground surface. The carrier wheel units and the tensioning wheel unit are pivotally mounted on the saddle beam by means of pendular arms that are pretensioned or biassed by means of torsion springs such as to enable respective wheel units to move resiliently over ground irregularities. The pendular arm of the known tensioning wheel unit is shorter than the pendular arm of the carrier wheel units, meaning that the suspension of the tensioning wheel unit will be more rigid, i.e. less resilient, than the spring suspension of the carrier wheel units. This limits passenger and driver comfort when driving over rough country and also results in an unfavourable distribution of the pressure exerted on the ground beneath the tracks. Furthermore, a tensioning wheel unit that includes a relatively short pendular arm will result in wide variations in track stretch as the tensioning wheel unit springs back and forth (up and down). This is because the pendular arm of the tensioning wheel unit has relatively pronounced movement in the longitudinal direction of the track as the unit springs inwardly.

SUMMARY OF THE INVENTION

One object of the present invention is to provide a novel and improved resilient track-tensioning device for tracked automotive vehicles, which as a result of improved resiliency and track-geometrical properties enables the tracked vehicle to move much more quickly over both rough country and on road surfaces with improved comfort. When driving at high speeds, for instance a speed of 75 km/hour, which can be compared to a speed of 50 km/hour in the case of earlier known tracked vehicles of the kind defined in the introduction, particularly high demands are placed on the wheel spring-suspension in the track-support assembly and also on the track-tensioning device and the spring system. Among other things, a longer resiliency path is required with regard to the individual ground-abutting carrier wheel and tensioning wheel units when travelling at high speed over rough ground. Furthermore, it is necessary for the spring characteristics of these wheel units to be as similar to one another as possible, therewith contributing to a low and uniformly distributed track ground pressure, which reduces the rolling resistance in the track support assembly. It is also essential that the tensioning wheel suspension is constructed so that inward springing of the tensioning wheel unit will result in the smallest possible variation in the geometric track length, so as to thereby minimize variations in track tension, these variations being liable to cause the track to lurch or twist when track tension is too slight and the track slackens, or in pronounced track wear and a shorter useful life span of bearings and bushings when the track tension is too high. The tensioning wheel suspension will also preferably be constructed so as not to affect the vertical position of the tensioning wheel unit, either when setting the initial track tension or as a result of tension force variations in the track, as may occur, for instance, when accelerating the engine. Such variations in track tension may otherwise cause the tensioning wheel unit positioned furthest to the rear of the vehicle to spring up or down and therewith create undesirable variations in track ground pressure. Such up and down movements of the tensioning wheel unit may also increase the risk of "fluttering" in the upper run of the track when moving forwards at high speeds.

In accordance with the invention, there is proposed a resilient track-tensioning device by means of which the aforesaid drawbacks of earlier known track-tensioning devices can be eliminated such as to enable tracked vehicles to be driven rapidly over rough or open country and on roads and highways, with enhanced suspension comfort. According to the invention, the inventive track-tensioning device is particularly characterized by virtue of the tensioning wheel arrangement including a generally elongated pendular arm which has a first end-part intended to rotatably support a tension wheel unit, and a second end-part having an attachment point for pivotal attachment of the pendular arm to the carrier, and which further includes a pretensioning arm which is substantially shorter than the pendular arm and which has a first end-part for power-transmitting engagement with the pendular arm at the end-part thereof which supports the tensioning wheel unit, and a second end-part for pivotal attachment to the carrier through the medium of a pretensioning member, and which further includes a device for adjustably fixing the distance between the rotational centre of the tensioning wheel unit and the attachment point of the pendular arm. Because the tensioning wheel unit moves essentially vertically as said unit springs inwardly, due to the long pendular arm, track tension will be influenced to a minimum.

Further characteristic features of the inventive resilient track-tensioning device are set forth in the dependent claims.

The invention also relates to a track support assembly for tracked automotive vehicles, comprising an elongated carrier which supports a plurality of track wheel units around which an endless drive track or tread is intended to run, said track wheel units including a drive wheel unit, a plurality of carrier wheel units and a track tensioning wheel arrangement, wherein the carrier wheel units are supported on the carrier by means of pendular arms which are orientated at oblique angles to said carrier and which are pivotally mounted on said carrier through the medium of a pretensioning or biassing means, wherein the inventive track support assembly is particularly characterized in that the tensioning wheel arrangement includes a) a generally elongated pendular arm whose one outer end-part rotatably carries one tensioning wheel unit and whose other inner end-part is pivotally mounted on the carrier, b) a pretensioning arm which is substantially shorter than the elongated pendular arm and whose one outer end-part is in force-transmitting engagement with the elongated pendular arm at that end-part thereof which carries the tensioning wheel unit, and whose other, inner end-part is pivotally mounted on the carrier through the medium of a pretensioning or biasing means, and c) a device for adjustably fixing the distance between the rotational centre of the tensioning wheel unit and the point of attachment of the elongated pendular arm to said carrier.

According to one particularly suitable embodiment of the track support assembly, the tension wheel unit is provided with essentially the same spring characteristic as the carrier wheel units irrespective of the inward springing path of the units, which provides a more uniformly distributed ground track pressure, lower rolling resistance and improved suspension comfort.

The horizontal moment arm of the pretensioning arm of the tensioning wheel arrangement, i.e. a horizontal projection of the distance between the pivot point of the pretensioning arm and the point of contact of the tensioning wheel unit with the drive track vertically beneath the rotational centre of the tensioning wheel unit, will be generally equal to the horizontal moment arm of the carrier wheel units, i.e. a horizontal projection of the distance between the pivot point of the pendular arms of the carrier wheel units and the point of contact of said units with the drive track. This enables the same pretensioning means (torsion springs) to be chosen for both the carrier wheel units and the tensioning wheel unit.

The inventive track support assembly affords particular benefits when the elongated pendular arm of the tensioning wheel arrangement is attached at a point on the carrier through which the force resultant of the track force components acting on the tensioning wheel unit extends irrespective of the working position of the elongated pendular arm. Because the force resultant extends through the point at which the elongated pendular arm is journalled in the carrier, the track tensioning wheel unit is prevented from tipping up and down when accelerating the engine for instance, and fluttering of the upper track run is also prevented when driving at high speeds.

In order to enable optimal track-handling geometry to be achieved, a support wheel unit which functions to support an upper run, or upper part, of the driving track is mounted to the carrier adjacent to the tensioning wheel arrangement.

In a normal operating state of the tensioning wheel unit, the elongated pendular arm will suitably extend generally in the longitudinal direction of the carrier, whereby the tensioning wheel unit will move generally vertically when springing inwards, such as to achieve a minimum change in the geometrical track length and in track tension as the tensioning wheel unit springs inwards.

BRIEF DESCRIPTION OF THE DRAWINGS

The pretensioning arm is preferably a torsion arm, wherein the pretensioning device is comprised of a torsion spring.

The invention will now be described in more detail with reference to the accompanying drawings, in which.

DETAILED DESCRIPTION OF THE INVENTION

Figure 1:
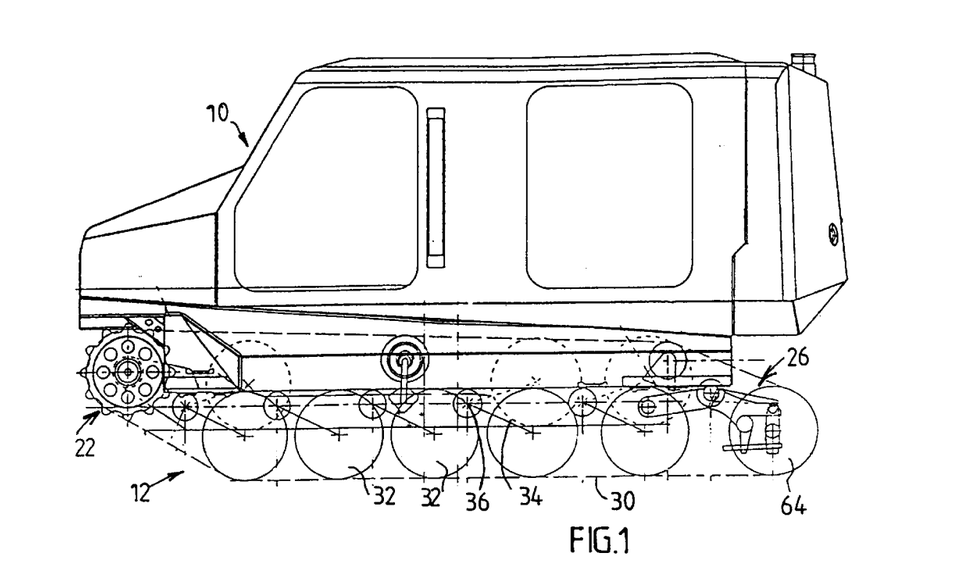
FIG. 1 is a side view of a front automotive tracked vehicle unit of an articulated tracked vehicle comprising two tracked units and provided with a track support assembly that includes an inventive resilient track-tensioning device.
Figure 2:
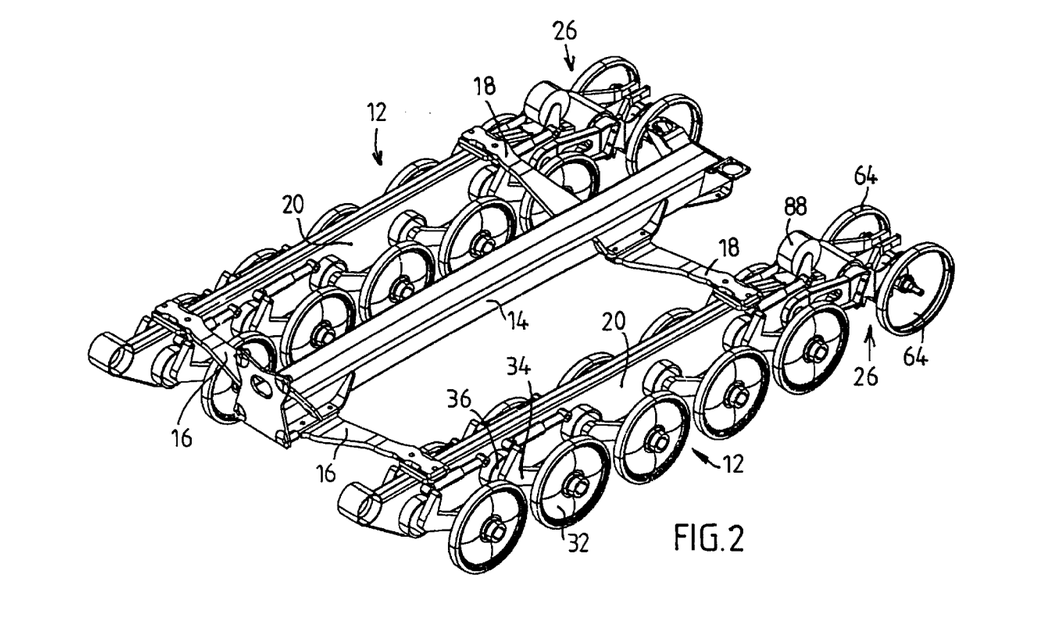
FIG. 2 is a schematic perspective view of the track support assembly belonging to the tracked vehicle unit shown in FIG. 1, certain components, such as drive wheels and drive tracks, being omitted in FIG. 2.
Figure 3:
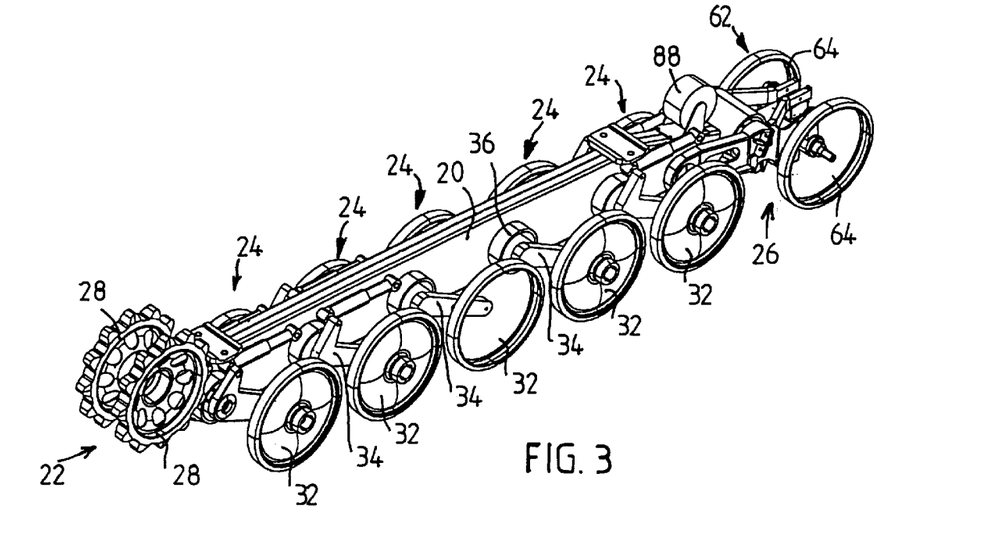
FIG. 3 is a schematic perspective view of one track support assembly in FIG. 1.
Figure 4:
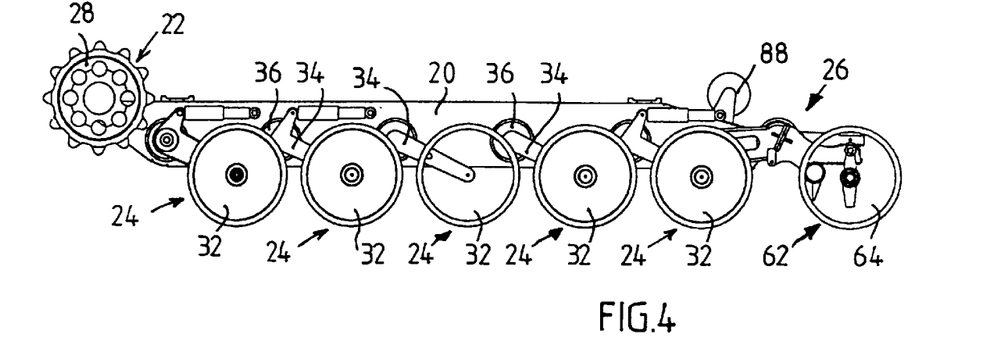
FIG. 4 is a side view of the track support assembly in FIG. 3.
Figure 5:
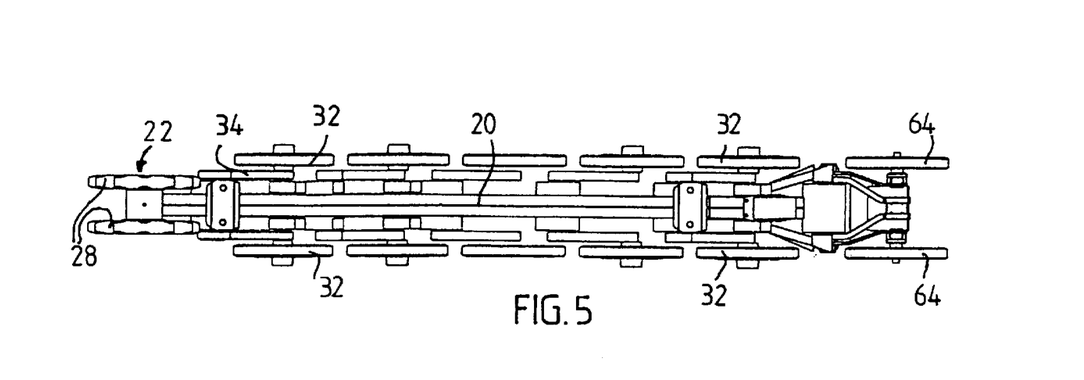
FIG. 5 shows the track support assembly of FIG. 3 from above.
Figure 6:
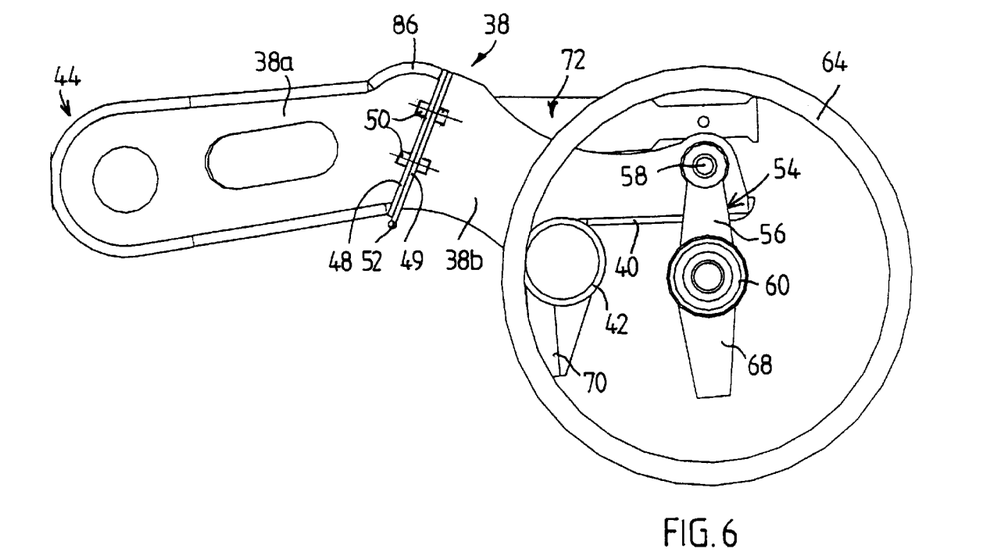
FIG. 6 is a schematic side view of a tensioning wheel arrangement according to the present invention, with certain parts omitted.
Figure 7:
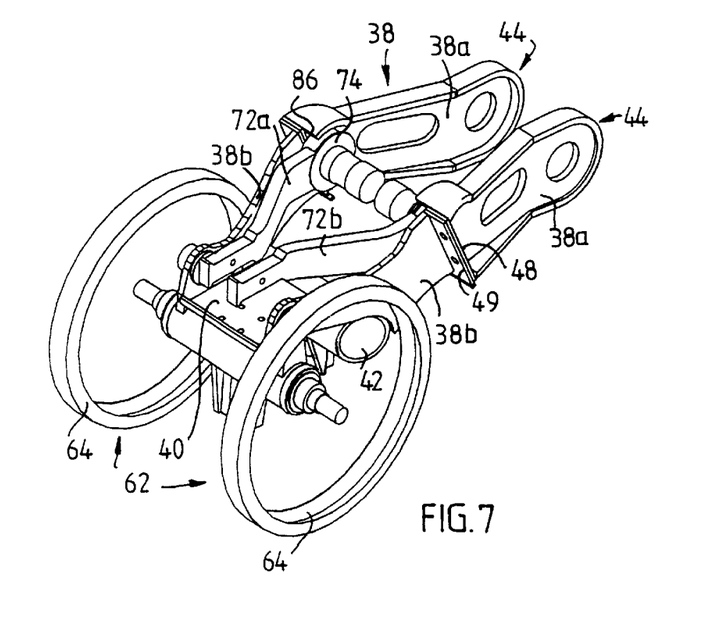
FIG. 7 is a schematic perspective view of the tensioning wheel arrangement shown in FIG. 6, and shows the arrangement obliquely from the rear and from above.

FIG. 1 illustrates a front automotive, or engine-equipped, tracked vehicle unit 10 belonging to an articulated tracked vehicle 10 comprised of front and rear tracked units. As shown in FIG. 2, in which certain components have been omitted, each tracked unit is equipped with two track support assemblies 12 which are connected with a carriage-carrying centre beam 14 by means of a pair of front and rear transverse arms 16 and 18 respectively. The construction of the track support assembly 12 is shown in more detail in FIGS. 3–5 and will be seen to include a carrier or so-called saddle beam 20 which carries a drive wheel unit 22, a plurality of carrier wheel units 24, in the present case five units, and a tensioning wheel arrangement 26 in accordance with the present invention.

The drive wheel unit 22 includes a pair of cog wheels 28 which are rotatably mounted in the front and upper part of the saddle beam 20 and which are intended for driving engagement with an endless driving track or tread 30 which runs around the wheel units in the track support assembly 12, said track 30 not being shown in FIGS. 2–5 but being indicated in broken lines in FIG. 1.

Each of the carrier wheel units 24 is comprised of a pair of carrier wheels 32 which are pivotally journalled on respective opposite long sides of the saddle beam 20 and which are rotatably carried on the outer end of a respective pendular arm 34, the other, inner end of which is attached to the saddle beam 20 through the medium of a pretensioning or biassing torsion spring 36 which is common to each opposing pair of carrier wheels 32.

The inventive tensioning wheel arrangement 26 by means of which the static track tension in the drive track 30 can be adjusted is supported at the rear on the saddle beam 20 in each track support assembly 12.

The structural aspect of the tensioning wheel arrangement 26 will now be described in more detail with reference to FIGS. 6–9. As will be seen from these Figures, the tensioning wheel arrangement 26 includes an elongated pendular arm 38 which comprises two mutually separated and mutually parallel front and rear side-arm parts 38a and 38b respectively, wherein the rear side-arm parts 38b are mutually connected rigidly by means of a flat web part 40 and a transverse tubular stiffening member 42. The front end-part 44 of the front side-arm parts 38a is constructed for pivotal connection to the saddle beam 20 about a pivot shaft 46 (FIGS. 9 and 10), through the medium of a slide bearing or plain bearing, not shown. The respective front and rear side-arm parts 38a and 38b of the pendular arm 38 are fixedly connected together through the medium of flange parts 48, 49 with the aid of screw joints 50 (FIGS. 6 and 9), and are pivotally and detachably connected to one another at the bottom thereof to facilitate a drive track change, as indicated at 52.

A tensioning wheel holder 54 is pivotally mounted on the rear end-part of the pendular arm 38. The holder 54 includes rocker arms 56 which depend from respective rear side-arm parts 38b and which are journalled at their upper ends on pivot pins 58 and which support at their bottom ends a transverse tubular shaft 60 for rotatably mounting a tensioning wheel unit 62 in the form of two axially spaced tensioning wheels 64.

In order to enable the static track tension in the drive track 30 that runs around the wheel units to be suitably adjusted initially, i.e. to enable the distance between the attachment point 46 of the pendular arm 38 and the rotational centre of the tensioning wheel 64 to be varied, the tensioning wheel arrangement includes an adjuster, or track tension setting device, in the form of an adjuster screw 66 (FIG. 9) which engages partly pivotally with a lever arm 68 which projects centrally downwards from the tubular shaft 60, and partly with a projection 70 on the tubular stiffening member 42 on the underside of the pendular arm. The adjuster screw 66 can be reached through a free space between the tensioning wheel unit 62 and the rear carrier wheel unit 24 (FIGS. 9 and 10) and enables the position of the tensioning wheels 64 in relation to the pivot centre 46 of the pendular arm 38 to be changed and therewith adjust the tension in the drive track 30.

Figure 8:
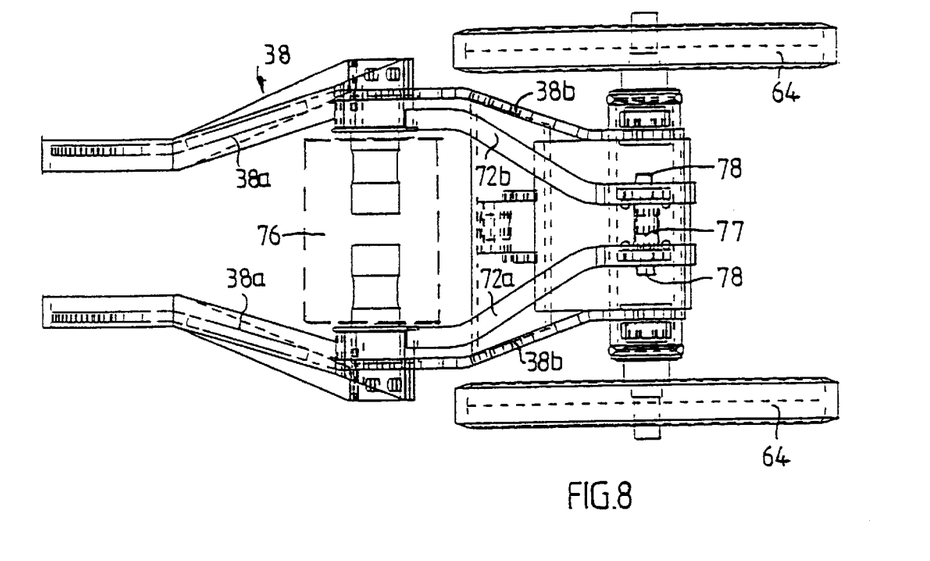
FIG. 8 shows the inventive tensioning wheel arrangement from above.
Figure 9:
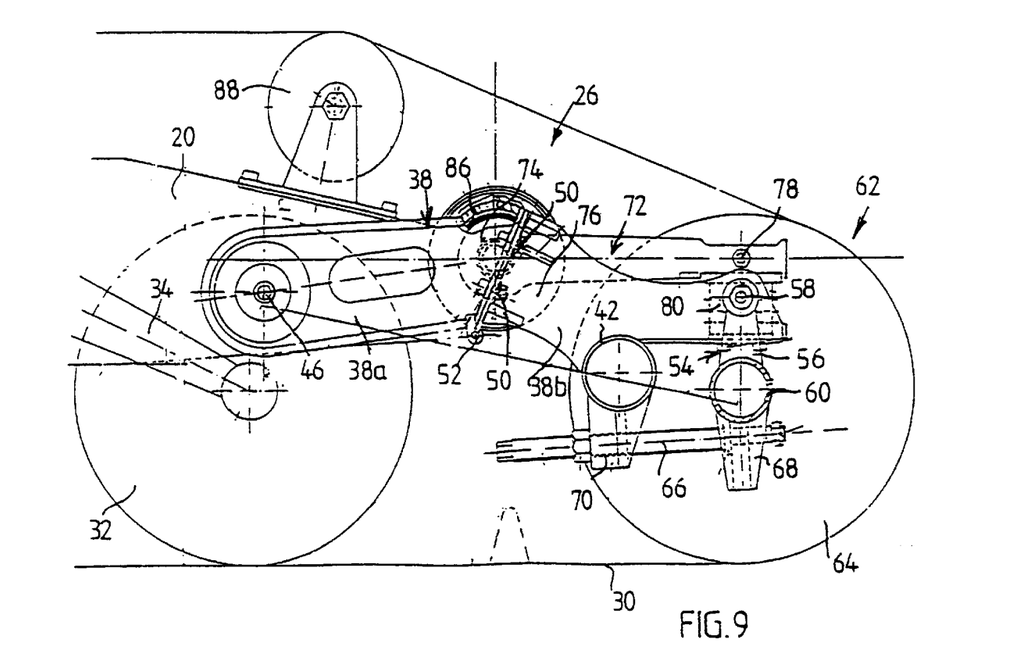
FIG. 9 shows the attachment means in side view and also illustrates a normal operating position of the inventive tensioning wheel arrangement on the rear end-part of a saddle beam included in the vehicle track support assembly.

The tensioning wheel arrangement 26 also includes a pretensioning arm or torsion arm 72 which acts on the rear end of the pendular arm 38 and which comprises two laterally spaced arm-parts 72a, 72b, the front ends 74 of which are attached to a torsion spring 76 mounted on the rear end of the saddle beam 20 and the rear ends of which are mutually joined by means of a spacer element 77 and a screw joint 78 (FIGS. 8 and 9). The torsion-arm parts 72a, 72b extend generally parallel with and inwardly of the rear pendular-arm parts 38b and slightly above said parts.

The torsion spring 76 is preferably of the same type and of the same size as the torsion springs 36 for the carrier wheel units 24 and, in a normal operating state, functions to exert a downward biassing force on the rear end of the pendular arm 38 through the medium of a force transmission element 80. The element 80 is comprised of a relatively pressure rigid rubber element, preferably reinforced with sheet metal lamellae, and which includes an upper plate 82 which is fitted into a corresponding aperture or recess on the underside of the rear end of the torsion arm 72, and a bottom plate 84 which is affixed to the web part 40 of the pendular arm 38.

The length of the torsion arm 72 is preferably such that its horizontally projected length will generally correspond to the horizontally projected length of the pendular arms 34 of the carrier wheels 32, thereby enabling essentially the same spring characteristics to be obtained with both the carrier wheels 34 and the tensioning wheels 64, therewith enabling the tensioning wheels 64 to function at the same time as carrier wheels that have essentially the same spring properties as the carrier wheels 34.

Because the torsion arm 72 is substantially shorter than the pendular arm 38, the rear ends thereof will describe slightly different paths as the tension wheels 64 spring inwards. For this reason, the rubber element 80 is relatively soft in a direction transversely to the pressure force transmission direction, i.e. to permit a given shearing movement of the rubber element 80 when the tensioning wheels spring inwards.

Figure 12:
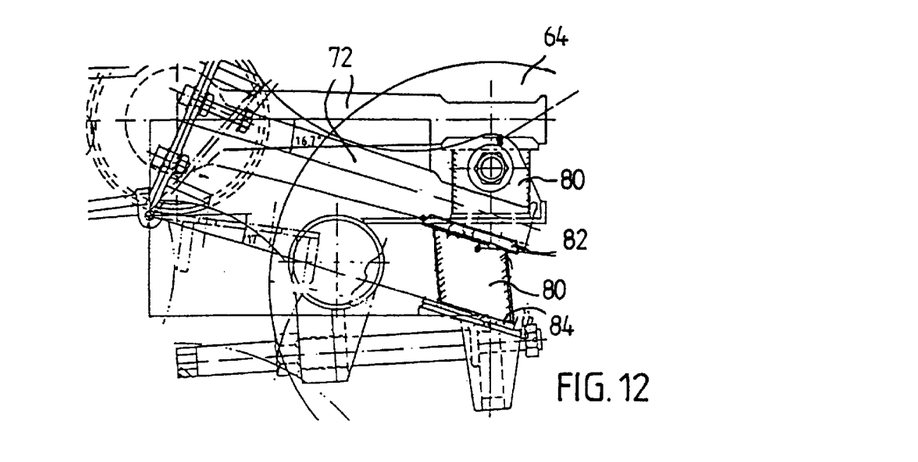
FIG. 12 is a side view illustrating the appearance and positioning of a rubber force-transmitting element located between the torsion arm and the pendular arm of the tensioning wheel arrangement, partly when fitting the element or when changing a drive track, wherein the element adopts a tensionless state, and partly in a normal operating state in accordance with FIG. 9.

In a free non-loaded state of the rubber element 80, which is the case when the element is to be fitted or when a driving track 20 is to be replaced, the rubber element 80 is generally rhomboidal when seen from one side, as shown in FIG. 12, wherein the upper and lower end plates 82, 84 are mutually displaced laterally through a given distance. Subsequent to a track exchange for instance, when the tensioning wheel arrangement 26 springs up to the normal position shown in FIG. 9, the rubber element 80 is pushed to the shape shown in FIG. 9 and at the top of FIG. 12.

Figure 10:
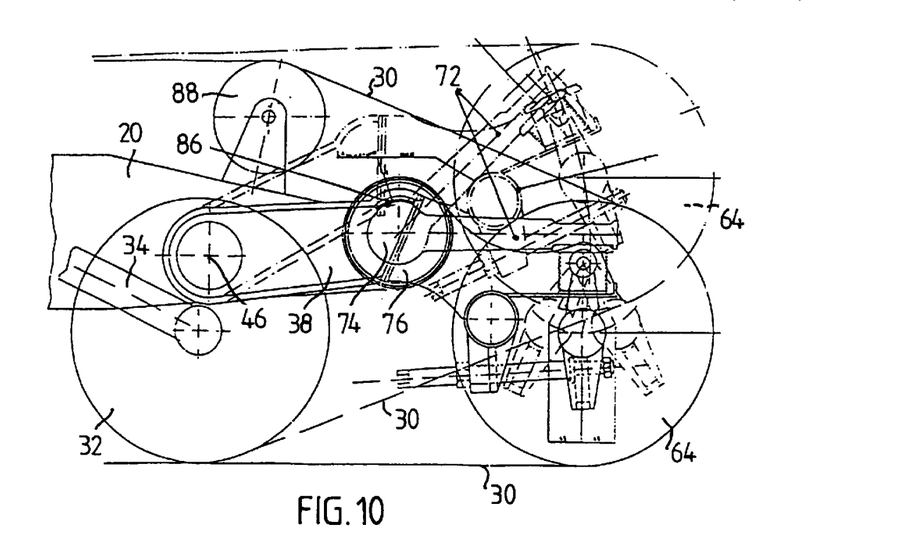
FIG. 10 is a view similar to the view of FIG. 9 and illustrates the two end positions of the tensioning wheel arrangement, i.e. the maximum extent to which the tensioning wheel unit moves resiliently.

FIG. 10 illustrates the normal, lower end-position of the tensioning wheel arrangement 26 in full lines and its maximum uplifted, inwardly sprung position in broken lines. Downward pendulating movement of the pendular arm 38 is restricted by an inwardly rubber-coated ledge 86 on the underside of said arm, on each pendular-arm part 38a, which ledge 86 may abut the attachment end 74 of the torsion arm 72 such as to limit said pendulating or pivotal movement, as shown in FIGS. 9 and 10. The upward pendulating movement of the pendular arm 38 may be restricted by the tubular stiffening member 42 as said member strikes against the underside of the torsion arm 72, as shown in broken lines in FIG. 10. Alternatively, upward pendulating movement can be restricted by virtue of the upper track run striking an overlying counterpressure surface on the vehicle chassis.

Due to the relatively long length of the pendular arm 38 and its generally horizontal extension, the tensioning wheels 64 will describe a very small movement in the horizontal direction as the tensioning wheels spring inwards, and consequently the geometric track length will not be influenced to any significant extent. This means that the tension in the drive track 30 will not be influenced by the resilient movements of the tension wheel arrangement 26, thereby avoiding the risk of the track twisting or lurching when the drive track slackens, and also avoiding the risk of rapid wear on the track and wear on the bearings when track tension is excessive.

Figure 11:
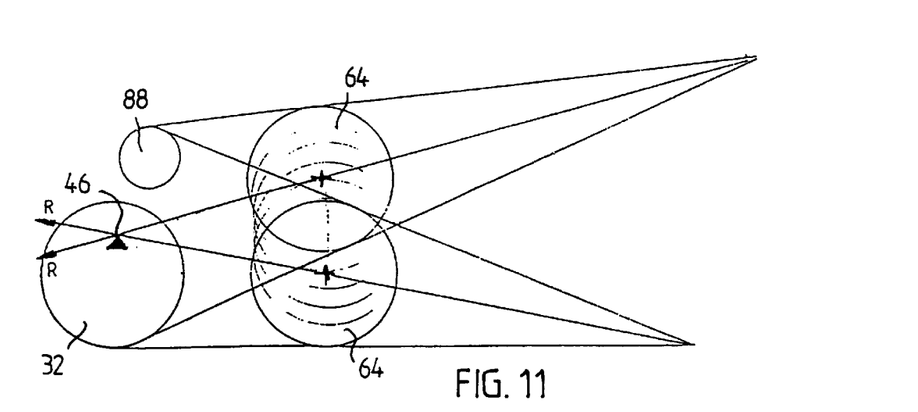
FIG. 11 illustrates schematically and in side view the direction of the resultant track force on the tensioning wheel unit at both of the end positions shown in FIG. 10, i.e. through the point at which the pendular arm of the tensioning wheel unit is attached to the saddle beam.

It is of essential importance that the tensioning wheel arrangement 26 has a geometry such that the force resultant R that acts on the tensioning wheels 64 and which derives from the tractive force components acting on the drive track over the tensioning wheels 64 extends through the point 46 at which the pendular arm 38 is attached to the saddle beam 20 irrespective of the prevailing position of the tensioning wheels 64 between said upper and lower end positions, as illustrated schematically in FIG. 11.

A support wheel 88 is mounted to this end in an appropriate position on the rear end-part of the saddle beam 20, such as to support the upper track run, or part, from the tensioning wheels 64. Such a tensioning wheel arrangement 26 counteracts the tendency of the tensioning wheels 64 to swing upwards or downwards when the engine of the vehicle is accelerated or when adjustments are made to the track tension.

I claim:

1. A resilient track-tensioning device for tracked automotive vehicles, comprising a track tensioning wheel arrangement intended to be mounted on a rear of a carrier for supporting track wheel units of a vehicle track support assembly, wherein the track tensioning wheel arrangement includes a) a generally elongated pendular arm having a first end-part which is adapted to rotatably support a track tensioning wheel unit, and a second end-part having an attachment point adapted for pivotal attachment of the pendular arm to the carrier, b) a pretensioning arm which is substantially shorter than the pendular arm and which has a first end-part for force transmission engagement with the pendular arm at the first end-part of the pendular arm which supports the track tensioning wheel unit, and a second end-part which is adapted for pivotal connection to the carrier via a pretensioning means, and c) a device for adjustably fixing the distance between the rotational center of the track tensioning wheel unit and the pendular arm attachment point.

2. The device according to claim 1, wherein the pretensioning arm extends above and generally parallel to the pendular arm.

3. The device according to claim 1, wherein the elongated pendular arm is comprised of two mutually spaced and generally parallel mutually connected side-arm parts.

4. The device according to claim 3, wherein each side-arm part can be separated into two parts, namely a first arm part for pivotal attachment to the carrier, and a second arm part for supporting the track tensioning wheel unit.

5. The device according to claim 4, wherein the track tensioning wheel unit is rotatably supported by the second arm part via a rocker arm unit.

6. The device according to claim 5, wherein the rocker arm unit is supported generally vertically in the second arm part.

7. The device according to claim 5, wherein the angular position of the rocker arm unit in relation to the second arm part can be adjusted to change the distance between the pivotal center of the pendular arm and the rotational center of the track tensioning wheel unit.

8. The device according to claim 7, wherein the angular position of the rocker arm unit can be adjusted by a screw element which is in engagement with a lever on the rocker arm unit and with a part of the pendular arm.

9. The device according to claim 8, wherein the screw element extends beneath and generally parallel to the pendular arm.

10. The device according to claim 3, wherein the pretensioning arm is positioned between the side-arm parts of the pendular arm.

11. The device according to claim 10, wherein the pendular arm includes a part which is engageable with the pretensioning arm and which is intended to limit downward pivotal movement of the pendular arm in relation to said pretensioning arm.

12. The device according to claim 1, wherein the first end-part of the pretensioning arm engages the first end-part of the pendular arm via a rubber element, in a force transmitting mode.

13. The device according to claim 12, wherein the rubber element is relatively rigid in a vertical direction, but relatively soft or pliable in a horizontal direction.

14. The device according to claim 13, wherein the rubber element has a bottom part which is firmly connected to a part which mutually joins the side-arm parts of the pendular arm.

15. The device according to claim 14, wherein an upper part of the rubber element is received in a recess on the underside of the first end-part of the pretensioning arm such as to fix the position of said rubber element.

16. The device according to claim 1, wherein the track tensioning wheel unit includes two axially separated track tensioning wheels journalled on a common axle.

17. The device according to claim 1, wherein the pretensioning arm is a torsion arm.

18. The device according to claim 17, wherein the pretensioning device is a torsion spring.

19. A track support assembly for tracked automotive vehicles, comprising an elongated carrier which supports a plurality of track wheel units around which an endless drive track is intended to run, wherein said units include a drive wheel unit, a plurality of carrier wheel units and a track tensioning wheel arrangement, wherein the carrier wheel units are supported by the carrier with the aid of pendular arms which are orientated at oblique angles to the carrier and which are pivotally mounted on said carrier via biassing means, wherein the track tensioning wheel arrangement includes a generally elongated pendular arm whose one outer end-part rotatably supports a track tensioning wheel unit and whose other, inner end-part has an attachment point which is pivotally mounted on the carrier, a pretensioning arm which is substantially shorter than the elongated pendular arm and whose one outer end-part is in force transmitting engagement with the elongated pendular arm at the end-part thereof that supports the track tensioning wheel unit and whose other, inner end-part is pivotally connected to the carrier via pretensioning means, and which further includes a device for adjustably fixing the distance between the rotational center of the track tensioning wheel unit and the attachment point of the elongated pendular arm to the carrier.

20. The track support assembly according to claim 19, wherein the track tensioning wheel unit has essentially the same spring characteristic as the carrier wheel units.

21. The track support assembly according to claim 20, wherein a horizontal projection of the distance between the pivotal point of the pretensioning arm and the point of contact of the track tensioning wheel unit with the track vertically beneath the rotational center of the track tensioning wheel unit is essentially equal to a horizontal projection of the distance between the pivot point of the pendular arms of the carrier wheel units and the point of contact of the carrier wheel units with the drive track.

22. The track support assembly according to claim 19, wherein the elongated pendular arm of the track tensioning wheel arrangement is attached at the attachment point on the carrier through which the force resultant of the track force components acting on the track tensioning wheel unit extend, irrespective of the working position of the elongated pendular arm.

23. The track support assembly according to claim 22, wherein a support wheel unit which functions to support an upper run of the driving track is mounted on the carrier adjacent to the track tensioning wheel arrangement.

24. The track support assembly according to claim 19, wherein the elongated pendular arm extends generally in the longitudinal direction of the carrier in a normal operating position of the track tensioning wheel unit.

25. The track support assembly according to claim 19, wherein the pretensioning arm is a torsion arm; and the pretensioning means is a torsion spring.

* * * * *